United States Patent
Markkanen

(10) Patent No.: US 12,305,128 B2
(45) Date of Patent: May 20, 2025

(54) LOW SULFUR FUEL OIL BUNKER COMPOSITION AND PROCESS FOR PRODUCING THE SAME

(71) Applicant: Neste Oyj, Espoo (FI)

(72) Inventor: Varpu Markkanen, Porvoo (FI)

(73) Assignee: NESTE OYJ, Espoo (FI)

( * ) Notice: Subject to any disclaimer, the term of this patent is extended or adjusted under 35 U.S.C. 154(b) by 346 days.

(21) Appl. No.: 18/045,395

(22) Filed: Oct. 10, 2022

(65) Prior Publication Data

US 2023/0059182 A1    Feb. 23, 2023

Related U.S. Application Data

(63) Continuation-in-part of application No. 16/645,935, filed as application No. PCT/FI2018/050640 on Sep. 11, 2018, now Pat. No. 11,466,222.

(30) Foreign Application Priority Data

Sep. 14, 2017  (FI) .................................... 20175815

(51) Int. Cl.
| | | |
|---|---|---|
| C10G 67/04 | (2006.01) | |
| B01D 3/10 | (2006.01) | |
| B01D 3/14 | (2006.01) | |
| B01J 19/24 | (2006.01) | |
| C10L 1/04 | (2006.01) | |

(52) U.S. Cl.
CPC ............. *C10G 67/049* (2013.01); *B01D 3/10* (2013.01); *B01D 3/143* (2013.01); *B01J 19/245* (2013.01); *C10L 1/04* (2013.01); *B01J 2219/004* (2013.01); *C10G 2300/1077* (2013.01); *C10G 2300/202* (2013.01); *C10G 2300/302* (2013.01); *C10G 2300/304* (2013.01); *C10G 2300/308* (2013.01); *C10G 2400/04* (2013.01); *C10L 2200/0446* (2013.01)

(58) Field of Classification Search
CPC .......... B01D 3/10; B01D 3/143; B01J 19/245; B01J 2219/004; C10G 67/049; C10G 2300/1077; C10G 2300/202; C10G 2300/203; C10G 2300/302; C10G 2300/304; C10G 2300/308; C10G 2400/04
See application file for complete search history.

(56) References Cited

U.S. PATENT DOCUMENTS

| | | |
|---|---|---|
| 3,245,900 A | 4/1966 | Paterson |
| 3,287,254 A | 11/1966 | Paterson |

(Continued)

FOREIGN PATENT DOCUMENTS

| | | |
|---|---|---|
| WO | 9727270 A1 | 7/1997 |
| WO | 2004074408 A1 | 9/2004 |

(Continued)

OTHER PUBLICATIONS

Finnish Search Report for Finnish Patent Application No. 20175815 dated Jan. 12, 2018 (2 pages).

(Continued)

*Primary Examiner* — Brian A McCaig
(74) *Attorney, Agent, or Firm* — Buchanan Ingersoll & Rooney PC

(57) ABSTRACT

The present disclosure relates to marine fuel compositions having low sulfur content and processes for making such compositions.

20 Claims, 2 Drawing Sheets

(56) References Cited

U.S. PATENT DOCUMENTS

| | | | |
|---|---|---|---|
| 3,464,915 | A | 9/1969 | Paterson et al. |
| 6,447,671 | B1 | 9/2002 | Morel et al. |
| 2010/0122934 | A1 | 5/2010 | Haizmann et al. |
| 2011/0198265 | A1* | 8/2011 | Colvar ............... C10G 67/049 208/56 |
| 2015/0038599 | A1 | 2/2015 | Kresnyak |
| 2015/0225657 | A1 | 8/2015 | Arora et al. |
| 2016/0145509 | A1 | 5/2016 | Mukherjee et al. |
| 2016/0312130 | A1 | 10/2016 | Merdrignac et al. |
| 2017/0066979 | A1 | 3/2017 | Lei et al. |
| 2017/0183575 | A1 | 6/2017 | Rubin-pitel et al. |
| 2018/0280827 | A1* | 10/2018 | Ladkat ................... C01B 3/56 |
| 2020/0277533 | A1 | 9/2020 | Markkanen |

FOREIGN PATENT DOCUMENTS

| | | |
|---|---|---|
| WO | 2010056436 A2 | 5/2010 |
| WO | 2015122931 A1 | 8/2015 |
| WO | 2016089590 A1 | 6/2016 |
| WO | 2017027795 A1 | 2/2017 |

OTHER PUBLICATIONS

International Preliminary Report on Patentability (PCT/PEA/409) mailed on Nov. 20, 2019, by the European Patent Office as the International Searching Authority for International Application No. PCT/FI2018/050640.

International Search Report (PCT/ISA/210) mailed on Nov. 20, 2018, by the European Patent Office as the International Searching Authority for International Application No. PCT/FI2018/050640.

ISO 8217-2017 Petroleum products—Fuels (class F)—Spesifications of marine fuels, Table 2 (2 pages).

Written Opinion (PCT/ISA/237) mailed on Nov. 20, 2018, by the European Patent Office as the International Searching Authority for International Application No. PCT/FI2018/050640.

Martínez, J., et al., "A Review of Process Aspects and Modelling of Ebullated Bed Reactors for Hydrocracking of Heavy Oils", Catalysis Review, Jan. 26, 2010, vol. 50, No. 1 (47 pages).

\* cited by examiner

LOW SULFUR FUEL OIL BUNKER COMPOSITION AND PROCESS FOR PRODUCING THE SAME

CROSS-REFERENCE TO RELATED APPLICATIONS

This application is a continuation-in-part of U.S. patent application Ser. No. 16/645,935, filed on Mar. 10, 2020, which is a national stage application of PCT/FI2018/050640, filed on Sep. 11, 2018, and which claims priority to Finnish Patent Application No. 20175815, which was filed on Sep. 14, 2017, the entire contents of all of which are hereby incorporated by reference.

FIELD OF THE INVENTION

The present invention relates to marine fuel compositions having low sulfur content and processes for making such compositions. Herein is provided a low sulfur fuel oil bunker component having advantageous properties. It also relates to upgrading vacuum residue.

BACKGROUND OF THE INVENTION

The current quality requirement of bunker oils in EU ECA (Emission Control Area) and North American ECA area require reduced sulfur emissions in marine traffic. This can be achieved by installation of flue gas cleaning system onboard or by use of bunker oil comprising max 0.5 or 0.1 wt-% sulfur content.

The limit for sulfur maximum content in marine fuels has gradually decreased during $21^{st}$ century from 4.5 wt-%, to 1 wt % and now to 0.1 wt-%. Previously, when the sulfur limit was max 1 wt-%, the bunker oils typically were obtained from heavy hydrocarbon fractions, such as from vacuum residue. Currently the low S bunker oils are mainly blends of distillates (gasoil type fractions), which are lighter fractions than vacuum residue, also referred to as light bunker or distillate fuel oil.

Some approaches have been described to achieve low sulfur content in bunker oil, for example produced by blending. Publication WO2015/122931 discloses marine fuels with low sulfur content comprising at least about 10 and up to 50%-wt of a residual hydrocarbon component. It further comprises a non-hydroprocessed hydrocarbon component with which properties of the blend are adjusted to form a marine fuel composition that meets requirements for the desired application.

Another publication on blends, WO2016/089590 discloses a low sulfur bunker which comprises a reduced concentration of components that have been cracked. The method comprises contacting a sulfur-containing vacuum residue feed stream with a hydrogen-containing gas in the presence of a hydrotreating catalyst, so that the product exhibits at most about 5000 wt ppm, for example at most about 1500 wt ppm sulfur. The product characteristics further comprise a pour point of at least about 20° C., and a kinematic viscosity of at least about 350 cSt at 50° C. This product may be blended with other components, selected from viscosity modifiers, pour point depressants, lubricity modifiers, antioxidants, and combinations thereof, to form a marine bunker fuel composition. However, these blends are lighter than the traditional bunker fuels which leads to a need to adjust the ship engines suitable for use of distillate type fuels.

It is known that to be applicable as bunker oil the heavier residues traditionally contain too high amount of sulfur, the removal of which, for example by catalytic hydrodesulfurization, is extremely demanding due to the difficult matrix. The sulfur and nitrogen derivatives, and heavy metals, such as organo-metallic derivatives of vanadium or nickel, are contained in the heavy oils as contaminants. Further, they are concentrated in the fractions of high molecular hydrocarbons. Generally, in order to be able to produce low S bunker merely by distilling crude oil there are several challenges. Firstly, the sulfur content of crude oil needs to be clearly below 0.1 wt % since gases and lighter fractions need to be distilled off from the crude oil in order to provide bunker with sufficiently high flash point. Usually sulfur content is higher the heavier the fraction is. Secondly, the production facilities need to be provided with distillation unit which is used only for stabilization of low sulfur bunker. However, the volumes of very low sulfur crude oils produced are not large and therefore not sufficient for the demand of the whole low sulfur bunker. Furthermore, the high metal content and acid number may cause technical problems in the process.

U.S. Pat. No. 3,902,991A discloses a low-sulfur content hydrocarbon mixture and fuel oil blend below 0.2 or below 0.1 wt-% sulfur which are obtained by hydrodesulfurizing vacuum gas oil under a hydrogen partial pressure of 300-800 psig with a select high activity desulfurization catalyst. Further embodiments include the hydrodesulfurization of sulfur-containing vacuum residuum and (1) mixing portions of the desulfurized hydrocarbon residuum with the vacuum gas oil feed or (2) blending fuel oil from portions of the desulfurized vacuum gas oil and desulfurized vacuum residuum product. Further process steps include (3) deasphalting of vacuum residuum or (4) hydrodesulfurizing vacuum residuum with delayed coking of at least a portion of the product.

U.S. Pat. No. 3,245,900 discloses a process which includes de-asphalted oil (DAO) as one of feeds to hydrocracker but it does not mention that this process could produce bunker with specific properties. The general object of said process is to provide increased catalytic cracking of the feedstock to be effectively converted into gasoline.

U.S. Pat. No. 3,287,254 discloses process to produce gasoline from DAO. The heaviest fractions are recovered as asphalt. No bunker oil recovery is disclosed. Said document dates back to time when emissions, such as sulfur, were less of a concern than today.

There is a need to produce low sulfur fuel oil bunkers required in the market. More specifically, there is a need to provide a low sulfur bunker oil component the use of which in marine engines requires minimum or preferably no modification of ship main engines or and which can meet the requirements for sulfur emissions of less than 0.5 wt-% and preferably less than 0.1 wt-% S. There is a further need for a fuel oil bunker blend that has low sulfur content and is less expensive to production. In addition, there is a need for increasingly effective use of all fractions from raw materials, especially crude oil.

An object of the present disclosure is to provide products, processes and systems to alleviate the disadvantages discussed above.

SUMMARY OF THE INVENTION

Herein is disclosed a low sulfur fuel oil bunker component the properties of which essentially correspond to earlier fuel oil bunker components, except for the sulfur content, which is less than 0.5 wt-% and preferably less than 0.1%-wt. More specifically, the low sulfur fuel oil bunker component is defined in aspect 1. Such low sulfur fuel oil bunker component provides benefits when used in marine engines. Compared to use of higher sulfur content fuels, the need for flue gas cleaning system is avoided. Compared to low sulfur lighter bunkers, the adjustments of engines due to lower density and/or viscosity are not necessary.

The low sulfur fuel oil bunker component is produced by a novel process. The present low sulfur bunker is produced by using vacuum residue treated at a solvent deasphalting (SDA) unit as feed for residue hydrocracking system. From residue hydrocracking, a low sulfur bunker oil component is obtained as residue. Vacuum distillate is used as feed, whereby the residue value is increased and hydrocracking residue value can be improved. Further, the process provides sulfur removal for residues, which earlier were considered too complex and demanding to be desulfurized as such. The steps of the present production method are defined in aspect 11.

Here is further disclosed a system suitable for production of low sulfur bunker oil component according to aspect 1 and for running process according to aspect 11. The essential elements of the system are defined in aspect 21. The embodiment of said system provide advantages through economical use of feeds and fractions thereof, enabling better value products and through process flexibility and adjustability.

The present application discloses an exemplary process for preparing a low sulfur fuel oil bunker component from a vacuum residue, the low sulfur fuel oil bunker component having: density at 15° C. between 0.985 and 0.999 g/cm$^3$; viscosity at 135° C. between 30-42 mm$^2$/s; acid number of less than 1 mg KOH/g; sulfur content of 4500-6000 wt ppm; and a nitrogen content of from 4000 to 5000 wt ppm, the process comprising:
  (a) providing a vacuum residue, and dividing said vacuum residue into a bypass stream and a feed to solvent deasphalting (SDA);
  (b) solvent deasphalting said feed to SDA and recovery of a deasphalted fraction;
  (c) hydrocracking a combined feed of said deasphalted fraction and the bypass stream at a hydrocracking unit having at least one ebullated bed reactor with constant catalyst activity; and (d) recovering the low sulfur fuel oil bunker component as a residue from said hydrocracking unit.

The present application also discloses an exemplary low sulfur fuel oil bunker component, having: density at 15° C. between 0.985 and 0.999 g/cm$^3$; viscosity at 135° C. between 30-42 mm$^2$/s; acid number of less than 1 mg KOH/g; sulfur content of 4500-6000 wt ppm; and a nitrogen content of from 4000 to 5000 wt ppm.

Further disclosed herein is a system for upgrading a vacuum residue to produce the low sulfur fuel oil bunker component using a deasphalted fraction. The system comprising: an atmospheric distillation unit configured for using crude oil as feed; a vacuum distillation unit configured to produce a vacuum residue; means for dividing the vacuum residue into a bypass stream and a feed to solvent deasphalting (SDA); a solvent deasphalting reactor system configured to contact the feed to solvent deasphalting (SDA) with a solvent to produce a deasphalted fraction; a residue hydrocracking system configured to contact the deasphalted fraction combined with the bypass stream, and hydrogen with a hydrocracking catalyst to produce a residue hydrocracking unit residue for an effluent; and a separator and fractionation unit for separating the effluent to recover a low sulfur fuel oil bunker component as the residue; wherein the low sulfur fuel oil bunker component includes a nitrogen content of from 4000 to 5000 wt ppm.

BRIEF DESCRIPTION OF THE DRAWINGS

The invention will be described in greater detail by means of preferred embodiments with reference to the attached accompanying drawings, in which.

DETAILED DESCRIPTION OF THE INVENTION

Figure 1:
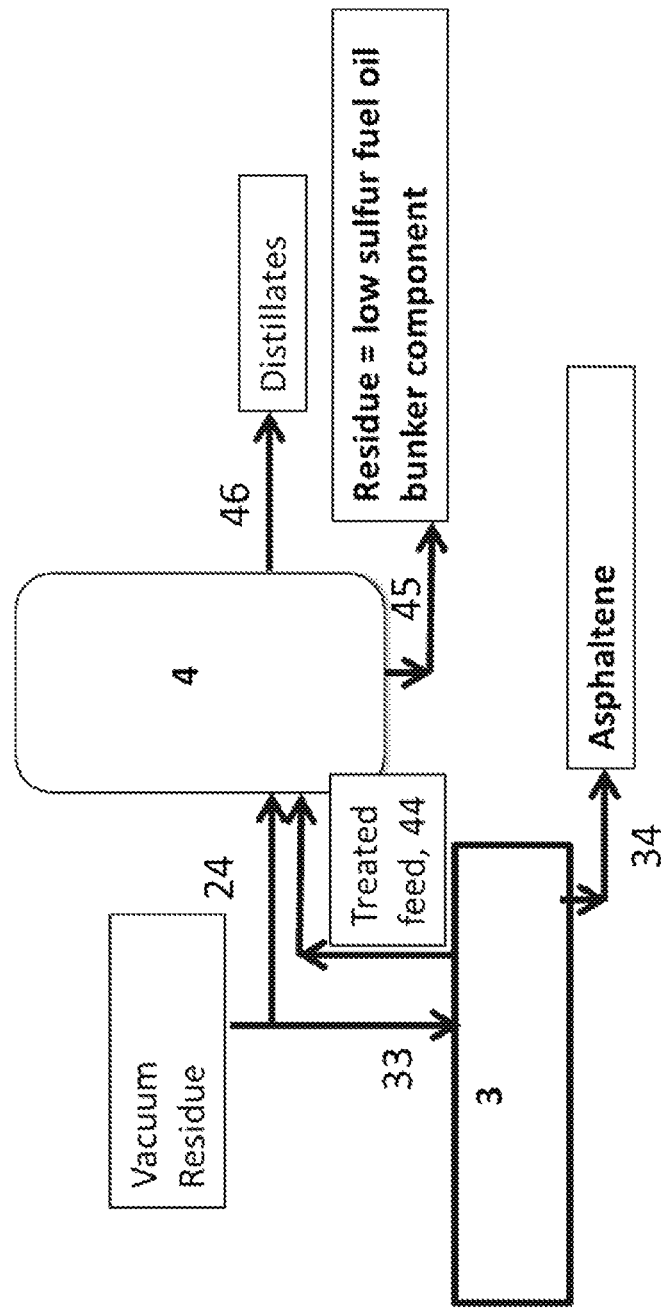
FIG. 1 shows a schematic process outline for the present process and system. Starting from vacuum residue, a part of the vacuum residue is bypassed directly, and a SDA feed pretreatment is applied to another part of the vacuum residue before feeding the stream, to residue hydrocracking unit. The residue recovered from residue hydrocracking unit has low sulfur content and is readily applicable as of low sulfur bunker oil component.

The present invention relates to fuel compositions, wherein fuel the properties are of bunker quality and the sulfur content is low. Such a fuel may be produced from oil refining residues applying a novel process sequence, which allows efficient removal of sulfur compounds. Use of such fuel in marine engines enables engines functioning without modifications to the equipment and at the same time, meeting sulfur emission requirements.

The terms "bunker oil", "fuel oil bunker", "bunker", "bunker fuel" and "marine fuel" refer to fuel suitable for use in marine engines. It is defined for example in standards, such as ISO8217. An example of a heavy bunker is RMG380 quality. Residual bunker specification determines the properties and characteristics which are required. Methods for measuring the central parameters, such as kinematic viscosity (at 50° C.), density, MCR, acid number, total sediment accelerated and flash point, are standardized and well known to a man skilled in the art. By these parameters, modern bunker oil may be characterized as in table 1 below. If said specifications are not met, the product is referred to as "off-spec bunker" and several engine problems are known to be related to use of such quality.

TABLE 1

Some heavy bunker characteristics according to standards and specifications.

| Parameter | Unit | Limit value |
| --- | --- | --- |
| Density | kg/m$^3$@15° C. | max. 991 |
| Viscosity | cSt@50° C. | max 380 |
| Sulfur | wt ppm | statutory requirements |
| MCR | wt-% | max 18 |
| Acid number | mg KOH/g | max 1.5 (current spec, new spec proposal max 2.5) |
| Flash point | ° C. | min 60 |
| Total sediment accelerated | wt-% | max 0.1 |

The term "sulfur emissions" are used herein to refer to the sulfur derivatives released when low sulfur fuel oil bunker component is combusted in use as marine fuel. The emissions are a concern and regulated by authorities, but in this case indirectly controlled by limits set to the fuel as such.

In the context of the present low sulfur fuel oil bunker component and the process for production of said low sulfur fuel oil bunker component, the sulfur content is of special relevance. With for example "sulfur content of less than 0.1%-wt" is referred to the weight of sulfur present in low sulfur fuel oil bunker component, which is less than 0.1% when compared to the total weight of the low sulfur fuel oil bunker component sample studied. Same applies to other sulfur contents. Alternatively, sulfur content may be referred to as ppm-wt, again expressed in relation to the total weight of the low sulfur fuel oil bunker component sample studied. Methods for determining sulfur content from an oil based matrix are well known and standardized in the art.

When characterized by parameters, the low sulfur fuel oil bunker component according to the present invention is characterized by density at 15° C. between 0.985 and 0.999 g/cm$^3$; viscosity at 135° C. between 30-42 mm$^2$/s; acid number of less than 1 mg KOH/g; sulfur content of 4500-6000 wt ppm; and a nitrogen content of from 4000 to 5000 wt ppm.

According to some embodiments, sulfur contents may be less than 0.1%-wt and even less than 0.05%-wt of the total low sulfur fuel oil bunker component weight. Such very low sulfur content qualities provide further benefits as blend components whereby total sulfur content of said blend may be provided even when the other component(s) contain higher sulfur contents.

The term "having" used herein is interchangeable with "comprising", and "including".

The present process is reflected to the product characteristics where in addition to parameters above defined, the amount of C7 insolubles is about 3 to about 4 wt-% of the total low sulfur fuel oil bunker component weight. C7 insolubles is a routine measure related to defining the asphaltene content.

Fuel pre-treatment designed to accelerate the ageing/sedimentation process, followed by filtration, is a well-established technique for testing whether sediment from residual fuel oils will precipitate during storage and handling. This could involve thermal ageing (heating to a specified temperature for a specified time) or chemical ageing (addition of a specified amount of a normal alkane to test whether the balance between the required aromaticity of the asphaltenes and the available aromaticity of the oil phase is disturbed to the extent that asphaltene precipitation occurs).

Total sediment accelerated (ISO 10307-2:2009) is another parameter used to evaluate this fuel quality. Precipitation of asphaltenes from a residual fuel oil in the form of sediment can occur during storage and handling. Such sediment can cause severe difficulties, and in extreme cases can render the fuel unfit for use. According to a preferred embodiment, total sediment accelerated is at most 0.1 wt-% of the total low sulfur fuel oil bunker component weight. A low sulfur fuel oil bunker component, wherein the total sediment accelerated is at most 0.05 wt-% of the total low sulfur fuel oil bunker component weight provides advantages as further embodiments for i.e. product storability also for blends containing present component.

Further, the present process contributes to a surprisingly low acid number in a low sulfur fuel oil bunker component. Accordingly, an embodiment of the invention provides a composition, wherein the acid number is less than 1 mg KOH/g, preferably less than 0.1 mg KOH/g, g referring to the total weight of the low sulfur fuel oil bunker component. In some embodiments, acid number may be less than 0.01 mg KOH/g.

Another important property included in bunker fuel specification is micro carbon residue (MCR) indicating the carbonaceous deposit forming tendencies of the fuel. The present process has provided unexpectedly low MCR-values for such heavy low sulfur fuel oil bunker component. Accordingly, in an embodiment of the present low sulfur fuel oil bunker component, the micro carbon residue (MCR) is between 14 to 21 wt-% of the total low sulfur fuel oil bunker component weight. Preferably between 17 to 18.5 wt-% of the total low sulfur fuel oil bunker component weight.

The solvent deasphalting as a pretreatment to the hydrocracking contributes to process run-ability through lower sulfur and nitrogen levels. Hence, according to an embodiment the low sulfur fuel oil bunker component having density at 15° C. between 0.985 and 0.999 g/cm$^3$; viscosity at 135° C. between 30-42 mm$^2$/s; acid number of less than 1 mg KOH/g; sulfur content of 4500-6000 wt ppm; and a nitrogen content of from 4000 to 5000 wt ppm.

A typical source for starting material or feed for the process is of mineral source. The term "mineral" is used herein to denote components or compositions that are naturally occurring and derived from nonrenewable sources. Here the most relevant is crude oil, which is used as a source to the overall process, wherefrom by distillations residues usable as feed are obtained. Examples of such crude oil resources include petroleum oil or shale oil and combinations thereof, also referred to a "fossil oil". Herein, the term "mineral" may also relate to the wastes, fractions and streams of nonrenewable sources.

Herein is further provided a novel process for producing a low sulfur fuel oil bunker component from a vacuum residue, the low sulfur fuel oil bunker component having: density at 15° C. between 0.985 and 0.999 g/cm$^3$; viscosity at 135° C. between 30-42 mm$^2$/s; acid number of less than 1 mg KOH/g; sulfur content of 4500-6000 wt ppm; and a nitrogen content of from 4000 to 5000 wt ppm, the process comprising:
(a) providing a vacuum residue, and dividing said vacuum residue into a bypass stream and a feed to solvent deasphalting (SDA);
(b) solvent deasphalting said feed to SDA and recovery of a deasphalted fraction;
(c) hydrocracking a combined feed of said deasphalted fraction and the bypass stream at a hydrocracking unit having at least one ebullated bed reactor with constant catalyst activity; and
(d) recovering the low sulfur fuel oil bunker component as a residue from said hydrocracking unit.

In an exemplary embodiment, is further provided the process disclosed herein comprising: crude oil atmospheric distilling and recovery of an atmospheric residue; and vacuum distilling said atmospheric residue and recovery of a vacuum residue. For example the process comprises: (a) crude oil atmospheric distilling 1 and recovery of an atmospheric residue 22; (b) vacuum distilling 2 said atmospheric residue and recovery of a vacuum residue and dividing said vacuum residue into a bypass stream 33 and a SDA feed 34; (c) solvent deasphalting said SDA feed 34 and recovery of a deasphalted fraction; (e) hydrocracking said deasphalted fraction and the bypass stream at a hydrocracking unit having at least one ebullated bed reactor with constant catalyst activity; and (f) recovering the residue hydrocracking unit residue from said hydrocracking unit.

Through this process, more efficient use of vacuum residue is obtained. The low sulfur fuel oil bunker component obtained is readily applicable as marine fuel and meets requirements set thereto. It may also be used as a blend component. The current inventor has found that the combination of solvent deasphalting and hydrocracking provides a way to produce low sulfur fuel oil bunker from vacuum residue, even using vacuum residue which has sulfur content about 3 wt-%.

Asphaltenes are defined as the heaviest components of crude oil. Their concentration in the crude oil is dependent on the crude oil origin itself. Asphaltenes are the highest molecular weight molecules in the crude, and contain all of the organically bound vanadium and most of the nickel found in the crude. Asphaltenes are insoluble in light n-alkanes such as n-heptane (nC7) but soluble in aromatics such as toluene. Their hydrogen content (and hence, combustion characteristics) can be quite different from one crude to another. Asphaltenes have predominantly aromatic structures.

With solvent deasphalting (SDA) is here referred to a separation process, wherein asphaltenes are separated from lighter hydrocarbons by physical means, with solvent. Solvent deasphalting uses an aliphatic solvent to separate the typically more valuable oils and resins from the more aromatic and asphaltenic components of its vacuum residue feedstock. In the process, the solvent is typically contacted countercurrent to the feed stream.

Solvent deasphalting is usually carried out under a temperature from 10 to 260° C., such as from 50 to 180° C., and a pressure from 3 to 100 atmospheres.

A suitable solvent is used to extract the desired fractions from vacuum residue. SDA processes are known to be used for pretreatment for several processes and include for example, the preparation of feedstocks for catalytic cracking, hydrocracking and hydrodesulfurisation units, as well as the production of specialty asphalts. In solvent deasphalting, the solvent used is selected from the group consisting of low molecular hydrocarbons such propane, butane, isobutane, pentane, isopentane, neopentane, hexane, isohexane and any mixture thereof. Here the preferred solvent is selected from heavy solvents, such as pentane or hexane, preferably n-pentane or n-hexane. The use of heavy solvents provides good yield. Also lighter solvents, such as propane, may be used providing purer product but poorer yield.

Heavy oil containing high amount of metals is converted to high quality diesel in residue hydrocracking (RHC) system. The RHC system may contain several reactors, where the vacuum residue is converted via demetallization, hydrocracking, desulfidation and denitrification reactions in the presence of a catalyst. RHC system comprises at least one reactor selected from an ebullated bed reactor, a slurry reactor, and mild hydrocracking reactor preferably a combination thereof. Residue hydrocracking system may also comprise other unit operations.

According to a preferred embodiment, the residue hydrocracking comprises at least one ebullated bed reactor. Ebullated bed reactor is a hydrocracking process upgrading heavy feed utilizing an ebullated or expanded catalyst bed. Feed enters the reactor at the bottom and moves upward towards the reactor exit. In the presence of hydrogen and catalyst, reactor, the feed is converted into distillate products (vacuum gas oil, diesel, kerosene and naphtha). A constant catalyst activity is maintained throughout the run by continuous addition and removal from the reactor. This also has the advantage of no pressure drop buildup over the reactor as would be the case with fixed bed residuum hydrocracking units. Ebullated bed reactor reactor is therefore especially suitable for continuous processes of heavy hydrocarbon feeds which contain high quantities of metals and solids. Ebullated bed reactors are on market and available from several providers.

The present inventor has surprisingly found that problems related to high sediment formation, and thereby fouling of the ebullated bed reactor downstream equipment, are alleviated through the present pretreatment with SDA. Without being bound to a theory, a reason for sediment formation is believed to be the material formed from asphaltenes, which tend to form small nanoaggregates (4-5 molecules) which still remain dispersed in the solution. Asphaltene side chains sterically prevent agglomeration of asphaltene nanoaggregates into larger entities. In ebullated bed reactor process, cracking of the aliphatic side chains of asphaltenes produce more compact and aromatic molecules which can easily aggregate into larger entities and are no longer dispersed into the oil. This separation of phases and fouling is decreased by the present process.

With the present process, the solvent deasphalting as a pretreatment to the hydrocracking further improves the long-term performance of the hydrocracking system through lower sulfur and nitrogen levels. Hence, according to embodiments of the present process, the low sulfur fuel oil bunker component produced accordingly is characterized by low nitrogen contents.

As described above, the core of the present process lies within combination of solvent deasphalting and hydrocracking reactions producing the low sulfur fuel oil bunker component. However, when considering the vacuum residue as a stream obtainable form vacuum distillation of atmospheric residue, the overall process from crude oil to low sulfur fuel oil bunker component, can be considered as follows:

A process for producing low sulfur fuel oil bunker component, wherein
 a) crude oil atmospheric distillation and recovery of an atmospheric residue,
 b) vacuum distilling said atmospheric residue and recovery of a vacuum residue,
 c) providing a vacuum residue, and dividing said vacuum residue into a bypass stream and a feed to solvent deasphalting (SDA),
 d) solvent deasphalting said feed to SDA and recovery of deasphalted fraction,
 e) hydrocracking a combined feed of said deasphalted fraction and the bypass stream at a hydrocracking unit having at least one ebullated bed reactor with constant catalyst activity; and
 (f) recovering the low sulfur fuel oil bunker component as a residue from said hydrocracking unit.

Atmospheric distillation and vacuum distillation are well known processes in oil refining. In a refinery crude oil is first distilled into fractions by atmospheric distillation. The residue from atmospheric distillation is further distilled by a vacuum distillation process using a reduced pressure to provide vacuum gas oil and bottom fraction called vacuum residue. It is also common general knowledge, that from said distillations and from hydrocracking, lighter products, referred to as distillates are recovered and refined through other processes.

As an outline, a system for upgrading a vacuum residue can be defined comprising at least:
- an atmospheric distillation unit configured for using crude oil as feed;
- a vacuum distillation unit configured to produce a vacuum residue;
- means for dividing the vacuum residue into a bypass stream and a feed to solvent deasphalting (SDA);
- a solvent deasphalting reactor system configured to contact the feed to solvent deasphalting (SDA) with a solvent to produce a deasphalted fraction;
- a residue hydrocracking system configured to contact the deasphalted fraction combined with the bypass stream, and hydrogen with a hydrocracking catalyst to produce a residue hydrocracking unit residue for an effluent; and
- a separator and fractionation unit for separating the effluent to recover a low sulfur fuel oil bunker component as the residue;
- wherein the low sulfur fuel oil bunker component includes a nitrogen content of from 4000 to 5000 wt ppm.

To describe in detail the system for producing low sulfur fuel oil bunker component, reference to FIG. 1 is made. Starting from the vacuum residue as feed, a vacuum residue is provided and said vacuum residue is divided into a bypass stream and a feed via line 33 to solvent deasphalting (SDA) reactor system 3. In SDA reactor system 3, the solvent separates oils and resins from the aromatic and asphaltenic components. The solvent is contacted countercurrent to the feed stream to extract the desired fractions from vacuum residue. The solvent here could be for example pentane or hexane, to provide a good yield. The asphaltenes are recovered via line 34 as a stream rich in sulfur, nitrogen and metal derivatives originating from the vacuum residue to be used in other applications. Solvent deasphalting said feed to SDA allows the recovery of a deasphalted fraction.

The deasphalted fraction recovered via line 44 provides the feed for and is introduced into the residue hydrocracking system 4, which may comprise several hydrocracking reactors. Input for hydrogen and a hydrocracking catalyst are not shown in figures. Residue hydrocracking system is followed by a standard separator and fractionation system (not shown) for separating the effluent and recover distillates via line 46 and to recover a low sulfur fuel oil bunker component via line 45.

Hydrocracking involves a combined feed of said deasphalted fraction and the bypass stream at a hydrocracking unit having at least one ebullated bed reactor with constant catalyst activity. The low sulfur fuel oil bunker component is recovered as a residue from said hydrocracking unit.

This system provides the advantage of efficient use of vacuum distillate. Further, present process and system provide a low sulfur fuel oil bunker component from vacuum residue via an advantageous process arrangement. The deasphalting reactor system provides benefits for the residue hydrocracking system by pretreatment to the feed, which comprises decreased levels of many contaminants, such as sulfur, nitrogen and metal derivatives and heaviest hydrocarbons, interfering hydrocracking reactions and contaminating catalysts. Further, the decreased MCR level leads to less coking problems and better run-times.

Figure 2:
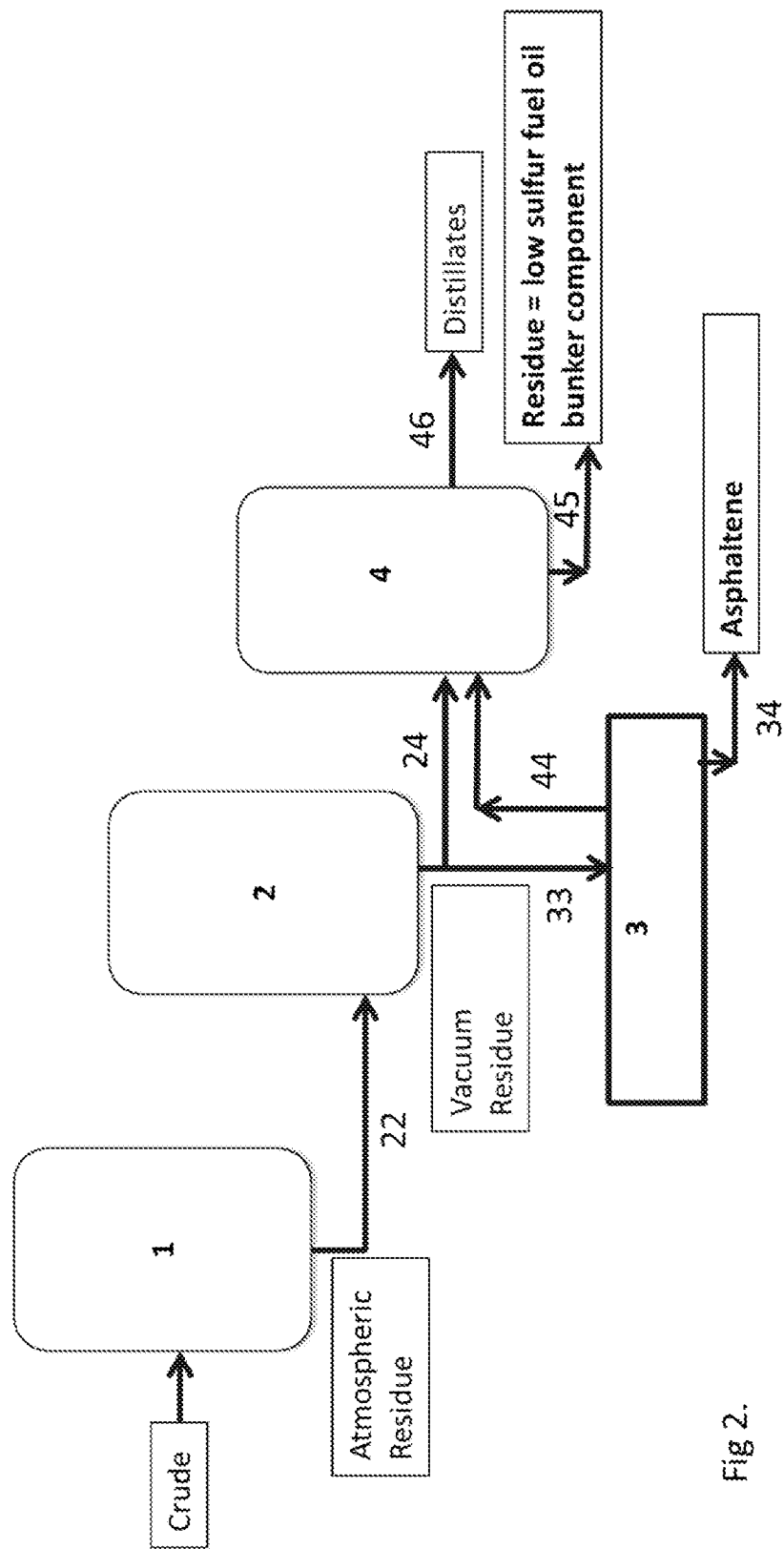
FIG. 2 shows as schematic process outline the steps preceding the process and system of FIG. 1, and can be considered as an embodiment of said process and corresponding system. The starting material for process of FIG. 2 is crude oil. It is subjected to distillation steps and residue is recovered for further refining.

However, considering the overall oil refinery process an embodiment of the present process and system can be seen in FIG. 2, wherein process steps starting from crude oil (mineral oil) are disclosed. Crude oil is fed via inlet 11 to the atmospheric distillation system 1. Distillates are recovered (not shown) and the atmospheric residue led via line 22 to vacuum distillation system 2. Again, the distillates recovered from vacuum distillation 2 are not shown, since the vacuum residue fed to solvent deasphalting (SDA) system 3 via line 33 is of interest here. The process continues as explained above in relation to FIG. 1, wherein the vacuum residue is provided and said vacuum residue is divided into a bypass stream and a feed via line 33 to solvent deasphalting (SDA) reactor system 3. In SDA reactor system 3, the solvent separates oils and resins from the aromatic and asphaltenic components. The SDA system serves as the feed pretreatment to the residue hydrocracking system 4. Since most sulfur compounds are removed with asphaltenes via line 34, the residue hydrocracking system 4 produces low-sulfur distillates 46 as a light fraction, and a heavy fraction useable a low sulfur fuel oil bunker component 45.

Through this embodiment, in addition to advantages discussed above, the total refining value of the mineral oil may be increased through higher value products obtained from the residues.

FIGS. 1 and 2 introduce a line 24, which provides a bypass from vacuum residue to the residue hydrocracking. With this arrangement the process is adjusted to flexible running: accordingly, the vacuum residue from vacuum distillation 2 divided into two separate steams, of which one is led via line 33 to a solvent deasphalting reactor system for contacting this part of the vacuum residue fraction with a solvent to produce a deasphalted fraction. This deasphalted fraction is led via line 44 together with the bypass stream via line 24 to a residue hydrocracking system for contacting the deasphalted fraction, the bypass stream and hydrogen with a hydrocracking catalyst to produce an effluent, from which distillates 46 and low sulfur fuel oil bunker component 45 are recovered. The part of the vacuum residue divided to the bypass stream, is led from vacuum distillation 2 via line 24 to the residue hydrocracking system 4 without SDA pretreatment. As used herein, the "bypass" refers to stream not subjected to SDA and in that sense, avoiding or passing SDA.

This arrangement provides flexibility to the process line. The process may be adapted to variations in feed quality or product demand by selecting the division between the bypass stream and the feed to the solvent deasphalting reactor system. Preferably the bypass stream is by weight minor to the feed to the solvent deasphalting reactor system, hence majority of the vacuum residue is subjected to SDA. According to a preferred embodiment, 60-70 wt-% of the vacuum residue is subjected SDA, and the rest, 30-40 wt-% of the vacuum residue directed to the bypass stream. Said two streams, the bypass and SDA feed preferably add up 100 wt-%

The processes may be operated continuously or in a batch run mode wherein the SDA system is used in batches to produce the present low sulfur fuel oil bunker component and between batches, the vacuum residue may be fed to residue hydrocracker without solvent deasphalting. In an embodiment of the present invention the vacuum residue fed to the hydrocracker is partly solvent deasphalted and partly not.

EXAMPLES

The following examples are provided to better illustrate the claimed invention and are not to be interpreted as limiting the scope of the invention. To the extent that specific materials are mentioned, it is merely for purposes of illustration and is not intended to limit the invention.

One skilled in the art may develop equivalent means or reactants without the exercise of inventive capacity and without departing from the scope of the invention. It will be understood that many variations can be made in the procedures described herein while still remaining within the bounds of the present invention. It is the intention of the inventors that such variations be included within the scope of the invention. The weight percentages given in relation to sulfur refer to %-wt or wt ppm of the total product weight.

Examples of Bunker Qualities

Comparative Example 1

Crude oil (medium heavy sour crude oil) was subjected to atmospheric distillation, the residue of which was fed to vacuum distillation. The vacuum residue thereby obtained was fed to a residue hydrocracking unit, which comprised an ebullated bed reactor. The product properties are given below in table 2.

TABLE 2

Product properties without SDA pretreatment.

| Parameter | Unit | Measured value |
| --- | --- | --- |
| Density | kg/m3@15° C. | 1015-1020 |
| Viscosity | cSt@50° C. | 70-90 |
| Sulfur | wt ppm | 10000-11000 |
| Nitrogen | wt ppm | 5000-6000 |
| MCR | wt-% | 20-21 |
| C7 insolubles | wt-% | 8-9 |

Both sulfur and nitrogen levels were too high. If such a residue was to be used in marine engines, a sulfur removal unit would be necessary onboard to meet the requirements set for emissions.

Comparative Example 2

Essentially same grade of crude oil, as in comparative example 1 was subjected to atmospheric distillation, the residue of which was fed to vacuum distillation. All the vacuum residue thereby obtained was treated by solvent deasphalting as feed pretreatment before feeding to the residue hydrocracking unit, again comprising an ebullated bed reactor. Table 3 describes the product characteristics of the low sulfur fuel oil bunker component recovered as a residue of the residue hydrocracking unit. The "residue" refers to the bottom product from product distillation, including the product separation.

TABLE 3

The residue hydrocracking unit residue quality with 100% SDA treated feed.

| Parameter | Unit | Measured value |
| --- | --- | --- |
| Density | kg/m³@15° C. | 915-960 |
| Viscosity | cSt@135° C. | 15-25 |
| Viscosity | cSt@50° C.* | ~300 |
| Sulfur | wt ppm | 500-1200 |
| Nitrogen | wt ppm | 1300-3000 |
| MCR | wt-% | 3-6 |
| C7 insolubles | wt-% | 0.1-0.5 |
| Acid number | mg KOH/g | 0 |
| Net heat value | MJ/kg | 42.2 |
| Flash point | ° C. | >60 |

*with 10% cutter stock: ~300

The final product quality e.g. viscosity was adjusted by blending the residue hydrocracking unit residue with cutter stock. When the residue hydrocracking unit residue viscosity was lower, less cutter stock was needed. Cutter stock is a petroleum stock which is used to reduce the viscosity of a heavier residual stock by dilution.

Typical treated feed sulfur content was 90-95% of the sulfur content of untreated feed, i.e. from the untreated feed, 5-10% of the sulfur was removed.

The experimental studies evaluated the properties of heavy fractions otherwise of low value. Experiments set up a process comprising a vacuum residue treated with SDA and fed to hydrocracker to produce a heavy bunker with a low sulfur content. Surprisingly the product thereby obtained is compatible with marine engines and at the same time met the recent requirements for low sulfur content.

Comparative Example 2

Differing from comparative example 1 and example 1 above, here a low sulfur crude oil was used as the feed. The sulfur content in said low sulfur crude oil was approximately 0.086 wt-%. A fraction which has boiling point above 250° C. was selected to secure flash point.

TABLE 4

Product properties without SDA pretreatment for a low sulfur crude oil.

| Parameter | Unit | Measured value |
| --- | --- | --- |
| Density | kg/m³@15° C. | ~910 |
| Viscosity | cSt@50° C.* | ~85 |
| Sulfur | wt ppm | ~850 |
| Nitrogen | wt ppm | ~2000 |
| MCR | wt-% | ~5 |
| C7 insolubles | wt-% | n.d. |
| Acid number | mg KOH/g | 2.3 |
| Net heat value | MJ/kg | 42.2 |
| Flash point | ° C. | 64.5 |

Bunker product was obtained by blending 40 wt-% of residue and 60 wt-% distillates. Bunker viscosity was low compared to typical quality and could not be controlled like when utilizing residue as main component in bunker. If used as a marine fuel, adjustments would be needed to marine main engines.

Example 1

Described herein, the residue hydrocracking system ('4' in the figures) is followed by a standard separator and fractionation system wherefrom distillates and a low sulfur fuel oil bunker component are recovered. The process disclosed herein describes the steps following the fractions leading to the low sulfur bunker component of interest.

The data was obtained from an ongoing process at a full scale oil refinery. Numerous parameters for the residue hydrocracking residue (bottom oil product) can be monitored. The process follows that presented in FIG. 2, wherein the process sequence varies as to how large a part of the vacuum residue is subjected to SDA and how large a part of the vacuum residue is bypassed via line 24, and the two combined fed to residue hydrocracking.

Table 5 below describes the Residue hydrocracking unit residue quality obtained using partly SDA treated feed. A vacuum residue was provided, and said vacuum residue was divided into a bypass stream and a feed to solvent deasphalting (SDA). Solvent deasphalting of said feed to SDA occurred and recovery of a deasphalted fraction. A combined feed of said deasphalted fraction and the bypass stream was hydrocracked at a hydrocracking unit the low sulfur fuel oil bunker component as a residue from said hydrocracking unit. The low sulfur fuel oil bunker component was recovered as a residue from said hydrocracking unit. Said divided vacuum residue provided a SDA feed containing 60-70 wt-% of the vacuum residue weight recovered from vacuum distilling, and 30-40% bypass stream (24, FIGS. 1 and 2) was cofed to the residue hydrocracking unit. Bypass stream refers to vacuum residue that is not subjected to SDA. Described here is a low sulfur fuel oil bunker component produced by the process using partly SDA treated feed.

TABLE 5

Low sulfur fuel oil bunker component properties.

| Parameter | Unit | Measured value |
|---|---|---|
| Density | kg/m$^3$@15° C. | 985-995 |
| Viscosity | cSt@135° C. | 30-40 |
| Viscosity | cSt@50° C.* | n.a. |
| Sulfur | wt ppm | 4500-6000 |
| Nitrogen | wt ppm | 4500-5000 |
| MCR | wt-% | 17-18.5 |
| C7 insolubles | wt-% | ~4 |
| Acid number | mg KOH/g | 0 |
| Net heat value | MJ/kg | n.d. |
| Flash point |  | >60 |

Table 6 below shows data collected from several continuous running periods of the process used to produce a Residue Hydrocracking Unit residue as described in Table 5, from partly SDA treated feed. The remaining feed to the unit 4 is from the bypass 24 (FIGS. 1 and 2).

The residue hydrocracking unit residue prepared from partly SDA-treated feed is used to prepare the final low sulfur fuel oil bunker component as described herein, by contacting the deasphalted fraction and hydrogen with a hydrocracking catalyst to produces an effluent, from which distillates and the final low sulfur fuel oil bunker component are recovered.

TABLE 6

Residue hydrocracking unit residue properties based on five running periods, the residue hydrocracking unit residue was prepared using 60-70 wt-% SDA-treated feed.

| | | Measured value | | | | |
|---|---|---|---|---|---|---|
| Parameter | Unit | Period 1 | Period 2 | Period 3 | Period 4 | Period 5 |
| Density | kg/m$^3$@15° C. | 990 | 989 | 994 | 988 | 998 |
| Viscosity | cSt@135° C. | 34 | 35 | 36.6 | 33.2 | 41.4 |
| Viscosity | cSt@50° C.* | n.a. | n.a. | n.a. | n.a. | n.a. |
| Sulfur | wt ppm | 6400 | 5750 | 6300 | 5300 | 5800 |
| Nitrogen | wt ppm | 4000 | 4500 | n.a. | n.a. | 5000 |
| MCR | wt-% | 20.6 | 14.7 | n.a. | 17.3 | 18.6 |
| C7 insolubles | wt-% | 3 | 3.1 | n.a. | 3.9 | 3.8 |
| Flash point | ° C. | >60 | >60 | >60 | >60 | >60 |

From these results, it is seen the present process lowers sulfur content providing the low sulfur fuel oil bunker component as claimed. Further, as to nitrogen contents, for example, the present process can deal with higher nitrogen contents than prior art processes. Advantages as to other parameters can be seen, especially in Periods 1-4. For example, Periods 1, 2 and 4 provide exceptionally good densities. The sulfur contents are good throughout all periods. The continuous data shows how the present process provides flexibility as the exact process can be decided and adjusted by feed quality, and apply SDA pretreatment to the residue hydrocracking when and to the extent required.

The following aspects are disclosed herein:
1. A low sulfur fuel oil bunker component, having:
   density at 15° C. between 0.985 and 0.999 g/cm$^3$;
   viscosity at 135° C. between 30-42 mm$^2$/s;
   acid number of less than 1 mg KOH/g;
   sulfur content of 4500-6000 wt ppm; and
   a nitrogen content of from 4000 to 5000 wt ppm.
2. The low sulfur fuel oil bunker component according to aspect 1, having density at 15° C. between 0.985 and 0.995 g/cm$^3$.
3. The low sulfur fuel oil bunker component according to aspect 2, having density at 15° C. between 0.985 and 0.991 g/cm$^3$.
4. The low sulfur fuel oil bunker component according to aspect 1, having viscosity at 135° C. between 30-40 mm$^2$/s.
5. The low sulfur fuel oil bunker component according to aspect 1, having nitrogen content of from 4500 to 5000 wt ppm.
6. The low sulfur fuel oil bunker component according to aspect 1, wherein an amount of C7 insolubles is about 3 to about 4 wt-% of the total low sulfur fuel oil bunker component weight.
7. The low sulfur fuel oil bunker component according to aspect 1, wherein the acid number is less than 0.1 mg KOH/g.
8. The low sulfur fuel oil bunker component according to aspect 1, wherein the micro carbon residue (MCR) is between 14 to 21 wt-% of the total low sulfur fuel oil bunker component weight.
9. The low sulfur fuel oil bunker component according to aspect 8, wherein the micro carbon residue (MCR) is between 17 to 18.5 wt-% of the total low sulfur fuel oil bunker component weight.
10. The low sulfur fuel oil bunker component according to aspect 1, having a sulfur content 5000-6000 wt ppm of the total low sulfur fuel oil bunker component weight.
11. A process for producing a low sulfur fuel oil bunker component from a vacuum residue, the low sulfur fuel oil bunker component having:
    density at 15° C. between 0.985 and 0.999 g/cm$^3$;
    viscosity at 135° C. between 30-42 mm$^2$/s;
    acid number of less than 1 mg KOH/g;
    sulfur content of 4500-6000 wt ppm; and
    a nitrogen content of from 4000 to 5000 wt ppm, the process comprising:
    (a) providing a vacuum residue, and dividing said vacuum residue into a bypass stream and a feed to solvent deasphalting (SDA);
    (b) solvent deasphalting said feed to SDA and recovery of a deasphalted fraction;
    (c) hydrocracking a combined feed of said deasphalted fraction and the bypass stream at a hydrocracking unit having at least one ebullated bed reactor with constant catalyst activity; and (d) recovering the low sulfur fuel oil bunker component as a residue from said hydrocracking unit.

12. The process according to aspect 11, comprising:
   crude oil atmospheric distilling and recovery of an atmospheric residue; and
   vacuum distilling said atmospheric residue and recovery of a vacuum residue.
13. The process according to aspect 11, wherein said dividing provides a SDA feed containing 60-70 wt-% of the vacuum residue weight recovered from vacuum distilling.
14. The process according to aspect 11, wherein the solvent deasphalting step b) is conducted at a temperature from 50 to 180° C. and a pressure from 3 to 100 atmospheres.
15. The process according to aspect 11, wherein in the solvent deasphalting step b), said solvent is a heavy solvent.
16. The process according to aspect 11, wherein in the solvent deasphalting step b), said solvent is a light solvent.
17. The process according to aspect 15, wherein the heavy solvent is at least one of hexane or pentane.
18. The process according to aspect 15, wherein the heavy solvent is at least one of n-hexane or n-pentane.
19. The process according to aspect 16, wherein the light solvent is propane.
20. The process according to aspect 11, wherein the hydrocracking unit includes at least one slurry reactor.
21. A system for upgrading a vacuum residue to produce low sulfur fuel oil bunker component, the system comprising:
   an atmospheric distillation unit configured for using crude oil as feed;
   a vacuum distillation unit configured to produce a vacuum residue;
   means for dividing the vacuum residue into a bypass stream and a feed to solvent deasphalting (SDA);
   a solvent deasphalting reactor system configured to contact the feed to solvent deasphalting (SDA) with a solvent to produce a deasphalted fraction;
   a residue hydrocracking system configured to contact the deasphalted fraction combined with the bypass stream, and hydrogen with a hydrocracking catalyst to produce a residue hydrocracking unit residue for an effluent; and
   a separator and fractionation unit for separating the effluent to recover a low sulfur fuel oil bunker component as the residue;
   wherein the low sulfur fuel oil bunker component includes a nitrogen content of from 4000 to 5000 wt ppm.
22. The system according to aspect 21, wherein the residue hydrocracking system configured to contact the deasphalted fraction combined with the bypass stream, and hydrogen with a hydrocracking catalyst comprises:
   at least one reactor selected to be one or more of an ebullated bed reactor, a slurry reactor, or a mild hydrocracking reactor; and/or
   the bypass stream contains 30-40 wt-% of the vacuum residue and the rest is fed to solvent deasphalting reactor system to produce the deasphalted fraction.

It will be apparent to a person skilled in the art that, as the technology advances, the inventive concept can be implemented in various ways. The subject matter in the above described embodiments may be combined in any permutations or manner. The same applies to subject matter of all dependent claims which may be used in any combination to restrict the independent claims. The invention and its embodiments are not limited to the examples described above but may vary within the scope of the claims.

The invention claimed is:

1. A low sulfur fuel oil bunker component, having:
   density at 15° C. between 0.985 and 0.999 g/cm$^3$;
   viscosity at 135° C. between 30-42 mm$^2$/s;
   acid number of less than 1 mg KOH/g;
   sulfur content of 4500-6000 wt ppm; and
   a nitrogen content of from 4000 to 5000 wt ppm.
2. The low sulfur fuel oil bunker component according to claim 1, having density at 15° C. between 0.985 and 0.995 g/cm$^3$.
3. The low sulfur fuel oil bunker component according to claim 2, having density at 15° C. between 0.985 and 0.991 g/cm$^3$.
4. The low sulfur fuel oil bunker component according to claim 1, having viscosity at 135° C. between 30-40 mm$^2$/s.
5. The low sulfur fuel oil bunker component according to claim 1, having nitrogen content of from 4500 to 5000 wt ppm.
6. The low sulfur fuel oil bunker component according to claim 1, wherein an amount of C7 insolubles is about 3 to about 4 wt-% of the total low sulfur fuel oil bunker component weight.
7. The low sulfur fuel oil bunker component according to claim 1, wherein the acid number is less than 0.1 mg KOH/g.
8. The low sulfur fuel oil bunker component according to claim 1, wherein the low sulfur fuel oil bunker component has a micro carbon residue (MCR) between 14 to 21 wt-% of the total low sulfur fuel oil bunker component's weight.
9. The low sulfur fuel oil bunker component according to claim 8, wherein the micro carbon residue (MCR) is between 17 to 18.5 wt-% of the total low sulfur fuel oil bunker component's weight.
10. The low sulfur fuel oil bunker component according to claim 1, having a sulfur content 5000-6000 wt ppm of the total low sulfur fuel oil bunker component weight.
11. A process for producing a low sulfur fuel oil bunker component from a vacuum residue, the low sulfur fuel oil bunker component having:
   density at 15° C. between 0.985 and 0.999 g/cm$^3$;
   viscosity at 135° C. between 30-42 mm$^2$/s;
   acid number of less than 1 mg KOH/g;
   sulfur content of 4500-6000 wt ppm; and
   a nitrogen content of from 4000 to 5000 wt ppm, the process comprising:
   (a) providing a vacuum residue, and dividing said vacuum residue into a bypass stream and a feed to solvent deasphalting (SDA);
   (b) solvent deasphalting said feed to SDA and recovery of a deasphalted fraction;
   (c) hydrocracking a combined feed of said deasphalted fraction and the bypass stream at a hydrocracking unit having at least one ebullated bed reactor with constant catalyst activity; and
   (d) recovering the low sulfur fuel oil bunker component as a residue from said hydrocracking unit.
12. The process according to claim 11, comprising:
   crude oil atmospheric distilling and recovery of an atmospheric residue; and
   vacuum distilling said atmospheric residue and recovery of a vacuum residue.
13. The process according to claim 11, wherein said dividing provides a SDA feed containing 60-70 wt-% of the vacuum residue weight recovered from vacuum distilling.

14. The process according to claim 11, wherein the solvent deasphalting step b) is conducted at a temperature from 50 to 180° C. and a pressure from 3 to 100 atmospheres.

15. The process according to claim 11, wherein in the solvent deasphalting step b), said solvent is a heavy solvent.

16. The process according to claim 15, wherein the heavy solvent is at least one of hexane or pentane.

17. The process according to claim 15, wherein the heavy solvent is at least one of n-hexane or n-pentane.

18. The process according to claim 11, wherein in the solvent deasphalting step b), said solvent is a light solvent.

19. The process according to claim 18, wherein the light solvent is propane.

20. The process according to claim 11, wherein the hydrocracking unit includes at least one slurry reactor.

* * * * *